US008108493B2

(12) United States Patent
Lakamp

(10) Patent No.: US 8,108,493 B2
(45) Date of Patent: *Jan. 31, 2012

(54) REMOTE ACCESS MANAGEMENT

(75) Inventor: Brian D. Lakamp, Malibu, CA (US)

(73) Assignees: Sony Corporation, Tokyo (JP); Sony Pictures Entertainment Inc., Culver City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/987,971

(22) Filed: Jan. 10, 2011

(65) Prior Publication Data

US 2011/0106918 A1 May 5, 2011

Related U.S. Application Data

(63) Continuation of application No. 11/120,809, filed on May 2, 2005, now Pat. No. 7,890,598.

(60) Provisional application No. 60/667,329, filed on Mar. 31, 2005.

(51) Int. Cl.
G06F 15/16 (2006.01)

(52) U.S. Cl. ......... 709/219; 709/217; 709/224; 709/227

(58) Field of Classification Search .......... 709/200–203, 709/217–227, 246
See application file for complete search history.

(56) References Cited

U.S. PATENT DOCUMENTS

| 5,884,312 | A * | 3/1999 | Dustan et al. ................. 1/1 |
| 6,529,949 | B1 | 3/2003 | Getsin et al. |
| 6,615,264 | B1 | 9/2003 | Stoltz et al. |
| 7,890,598 | B2 * | 2/2011 | Lakamp ................. 709/217 |
| 2002/0114461 | A1 | 8/2002 | Shimada et al. |
| 2002/0116082 | A1 | 8/2002 | Gudorf |
| 2003/0174648 | A1 | 9/2003 | Wang et al. |
| 2003/0177250 | A1 | 9/2003 | Oliver et al. |
| 2003/0217122 | A1 | 11/2003 | Roese |
| 2003/0237006 | A1 | 12/2003 | Himmel et al. |
| 2004/0031058 | A1 | 2/2004 | Reisman |
| 2004/0054893 | A1 | 3/2004 | Ellis |
| 2004/0059951 | A1 | 3/2004 | Pinkas et al. |
| 2004/0242197 | A1 | 12/2004 | Fontaine |
| 2005/0025182 | A1 | 2/2005 | Nazari |
| 2006/0167985 | A1 | 7/2006 | Albanese et al. |

* cited by examiner

Primary Examiner — Moustafa M Meky
(74) Attorney, Agent, or Firm — Samuel S. Lee; Procopio, Cory, Hargreaves & Savitch LLP

(57) ABSTRACT

A remote access management service for enabling remote access to an item of media content stored in a network device from a remote device, said network device including a remote access server application program and account information identifying said remote device, and said remote device including a remote access client application program, the service including: an interface configured to provide network connections to said network device and said remote device; and a remote access management application program to collect information on remote access analysis by monitoring remote access transactions between said remote device and said network device, said remote access management application program operating to receive a remote access request from said remote access client application program including said account information and a content identifier indicating said item of media content.

16 Claims, 3 Drawing Sheets

REMOTE ACCESS MANAGEMENT

CROSS-REFERENCE TO RELATED APPLICATIONS

This application is a continuation application of a co-pending U.S. patent application Ser. No. 11/120,809, filed May 2, 2005, entitled "REMOTE ACCESS MANAGEMENT", which claims the benefit of priority of U.S. Provisional Patent Application No. 60/667,329, filed Mar. 31, 2005, entitled "REMOTE ACCESS MANAGEMENT". The disclosures of the above-referenced patent applications are incorporated herein by reference.

BACKGROUND

A need exists for providing remote access to data by authorized users. For example, many consumers today have amassed substantial music collections in the compact disk (CD) audio format. The physical aspect of such a large collection however means that consumers wishing to enjoy their collections from any place other than where the collection is located must make a choice as to which CDs to take with them. This means less than the entire collection is remotely available for the consumer's enjoyment.

Electronic security systems have been configured to manage access to data so that only authorized users can remotely access the data. However, there is a need for remote access monitoring and management of authorized users for appropriate remote use of data according to usage rights.

SUMMARY

The present invention provides systems, methods, and programs for remote access monitoring that tracks and analyzes remote access use of media stored in a home network.

DETAILED DESCRIPTION

The present invention provides systems, methods, and programs for remote access monitoring that tracks and analyzes remote access use of media stored in a home network. Access could also be made to content not stored on the home network, but accessible to the home network, e.g., live TV channels or other streamed content. Based on that analysis, an entity that produced the media (i.e., the media company) can control how the remote access is being used and limit inappropriate remote access.

Several illustrative examples of implementations are presented below. These examples are not exhaustive and additional examples and variations are also described later.

Figure 1:
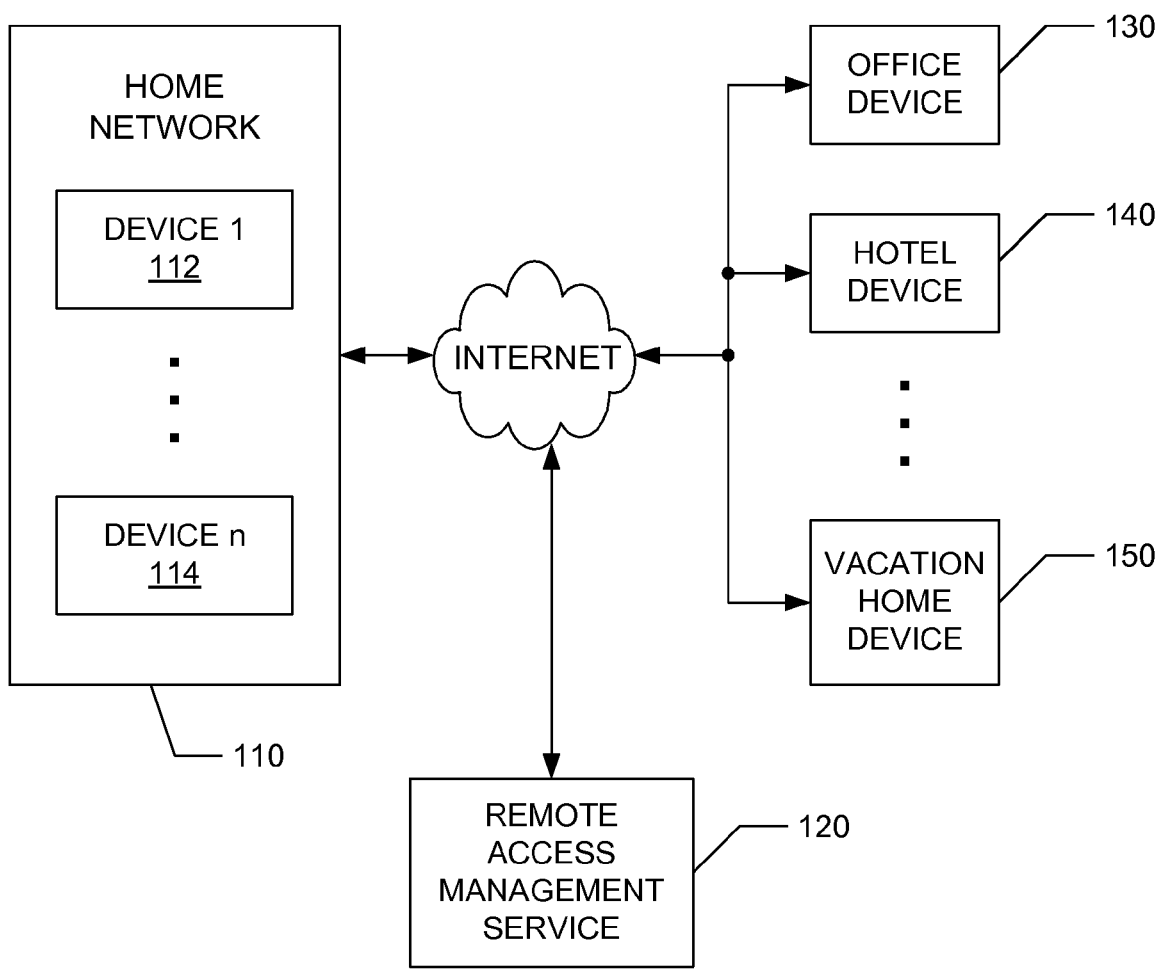
FIG. 1 shows a remote access management system that enables and monitors remote access to music, movie, and/or program files from server(s)/device(s) storing the content.

FIG. 1 shows a remote access management system 100 that enables and monitors remote access to music, movie, and/or program files from server(s)/device(s) 112, 114 storing the content. Examples of music files include audio files in uncompressed formats such as wave and audio files in compressed formats such as mp3. Examples of movie file include files in AVI, mpeg, and QuickTime formats. Examples of program files include audio processing programs such as ACID Pro and Sound Forge. Examples of servers include computing devices such as a computer. Examples of devices include network enabled devices such as phone, set-top box, and personal digital assistant (PDA). The music, movie, or program files are collectively referred to as media. In addition, the remote access server may distribute licenses only to portable players where the content has been distributed by alternative means including super distribution or has been delivered by the remote access system previously but the license is no longer available. Super distribution is a process by which consumers help increase the distribution and sales of packaged files by sharing them with other consumers.

In the illustrated implementation of FIG. 1, the server(s)/device(s) 112, 114 storing the media are configured into a home network 110; and the media can be remotely accessed from a remote device 130, 140, or 150 in the office, hotel, vacation home, or other sites whose physical locations are different from the home network. The remote access to the home network 110 is then enabled through a wide area network such as the Internet. Remote access to the home network 110 can be enabled through other means such as a cellular network. The home network 110 can be either a wired or wireless network.

The remote access management system 100 also includes a remote access management service 120 that tracks and analyzes remote access use of the media stored in the home network 110 by the remote device 130, 140, or 150. In one example, the remote access management service 120 comprises a network server including a storage and software to analyze, track, and authorize remote access. Based on that analysis, the media company can control how the remote access is being used and limit inappropriate remote access. The remote access is typically enabled by remote access server software residing on each of the server(s)/device(s) 112, 114 of the home network 110 and remote access client software residing on the remote device 130, 140, or 150.

In one example, the consumer stores an item of media on a home network device, such as a personal computer (PC) 112. The personal computer 112 includes a connection to the Internet (e.g., through a router and a broadband modem). The personal computer 112 also includes remote access server software so that an authorized remote device 130, 140, or 150 can access the media stored on the personal computer 112. Typically, the item of media is stored as an encrypted file and the authorized remote device can decrypt the encrypted file.

To initiate the remote access, the consumer generates account information with remote access server software on the personal computer 112. The account information includes information about the consumer, such as a name, and authentication information, such as a password. The consumer also attaches or associates one or more devices with the account by providing identifying information to the server software (e.g., a MAC address or unique device ID). The consumer then causes the server software to make the media available to authorized remote devices 130, 140, or 150 for this account.

Specifically, the server software opens a connection to a remote access management service 120, which is connected to the Internet. The server software sends information identifying the home network 110 and the available media to the remote access management service 120.

The consumer also has a remote device (e.g., the office device) such as a laptop computer 130 including remote access client software. The consumer takes the laptop computer 130 to a different location from the home network 110 and accesses the Internet using the laptop computer 130. The consumer uses the remote access client software to request remote access to the home network 110. The request may also include a content identifier to identify the media to access remotely. To access the home network 110, the client software establishes a connection between the laptop computer 130 and the remote access management service 120.

Once the connection is made, the management service 120 requests authentication information from the client software on the laptop computer 130. In response to the request, the client software sends authentication information to the management service 120 identifying the consumer, the laptop computer 130, and the home network 110 to access. The management service 120 opens a connection with the personal computer 112 in the home network 110 and requests authentication of the consumer by sending the authentication information received from the laptop computer 130 to the server software on the personal computer 112.

In one example, after the server software on the personal computer 112 has authenticated the consumer and the laptop computer 130, the management service 120 evaluates the current request in light of recent activity for this account. The management service 120 uses a set of rules (e.g., stored as data by the management service 120) to determine if the requested access is appropriate or not.

In another example, a set of rules is selected based on the content identifier that identifies the media to access. In this example, a different set of rules is selected for each media.

The management service 120 analyzes collected data on remote access use and the provided rules to determine whether to authorize the remote access request or not. The management service 120 utilizes statistical analysis to evaluate the remote access transactions and use patterns. The rules are set for the management service 120 by the media company. However, rules for other content and accounts can be set by other companies.

Different rules can be applied for different implementations. For example, in a particular implementation, one rule is to prevent simultaneous access by the same account from different remote devices. Another rule is to prevent simultaneous access by the same account from different remote networks. Another rule is to prevent access by the same account from multiple remote networks at a very high frequency (e.g., multiple accesses in a short period of time from multiple remote networks). Different physical locations of the remote device can be estimated from the network address. Another rule is to base access authorization on usage time of day pattern so that, in one example, remote accesses between 10 pm and 1 am are prevented. Another rule could allow the management system to require delays between content (media) acquisition and remote access. For example, a four-hour delay is required after the end of a television program before allowing remote access. Another rule could specify restrictions on remote access to certain geographical areas, e.g., US only, or certain TV broadcast areas. Various other rules can also be applied.

The management service 120 performs a statistical analysis of remote access configurations and usages based on the provided rules and determine whether the remote access request is appropriate. In one example, the remote access usages are based on prior and/or current remote access usages. If the management service 120 determines that the request is not appropriate, the management service 120 denies the request for access. If the management service 120 determines that the request is appropriate, the management service 120 grants the request and authorizes the remote access.

The client software on the laptop computer 130 receives the authorization and establishes a connection between the laptop computer 130 and the personal computer 112 of the home network 110. The server software on the personal computer 112 then provides access to the requested media (e.g., by streaming or downloading).

In one implementation, the server software confirms with the management service 120 before granting access. In another implementation, the server software can check for license rules of the media to determine whether the remote access should be allowed under the terms of license agreements.

In some implementations, access can be indirect. For example, once the client software on the laptop computer 130 receives the authorization, the server software on the personal computer 112 can provide access to media on device 114.

In managing remote access, the remote access management service 120 receives and transmits various data related to the remote access use. In one implementation, the client software in the remote laptop computer 130 and the server software in the personal computer 112 of the home network 110 send logs and/or updates to the management service 120 while the connection is open and active. The management service 120 stores the updates for future use in authorizing remote access. The management service 120 also stores the results of the analysis for future evaluation.

In another implementation, the management service 120 does not prevent access but only monitors the remote access logs and/or updates for fraudulent activity. The management service 120 can then report the fraudulent activity to the media company. In other implementations, the management service 120 can report all activities to the media company.

Figure 2A:
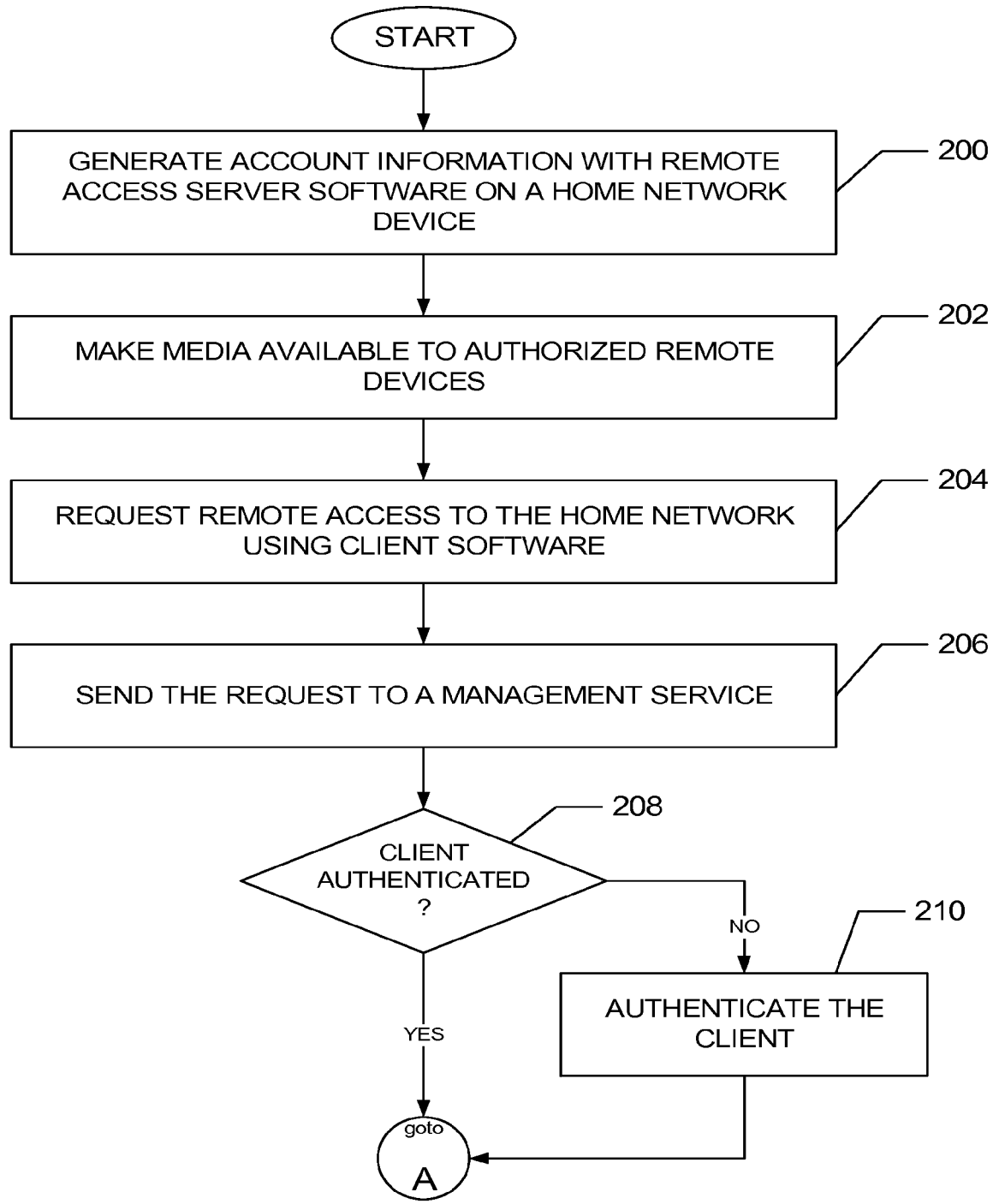
FIGS. 2A and 2B is a flowchart showing a remote access management method that enables and monitors remote access to music, movie, and/or program files (i.e., media) from home network server(s)/device(s).
Figure 2B:
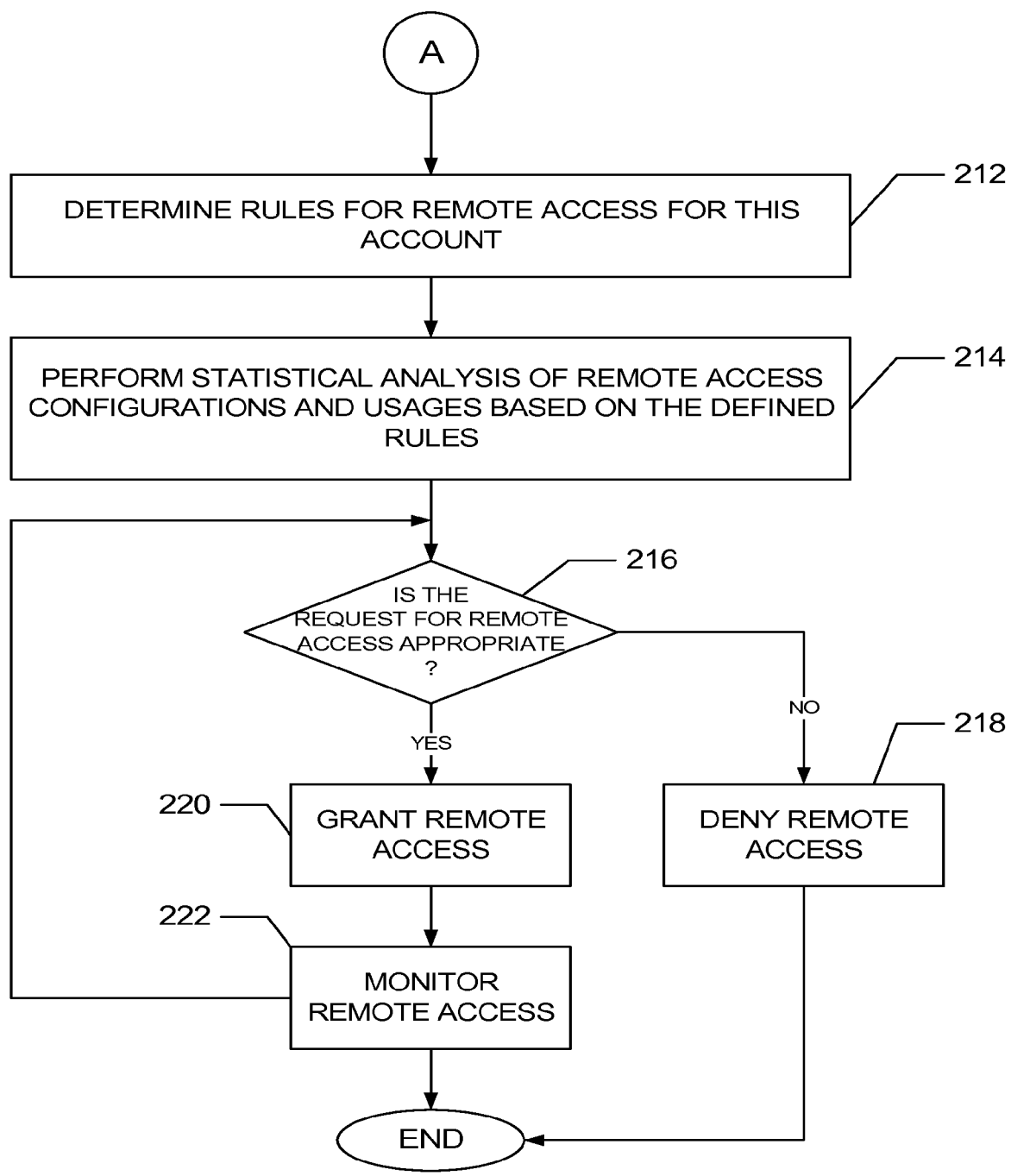

FIGS. 2A and 2B show a remote access management method that enables and monitors remote access to music, movie, and/or program files (i.e., media) from home network server(s)/device(s). To initiate the remote access, the consumer generates, at 200, account information with a remote access server software on a home network device. The account information includes information about the consumer, such as a name, and authentication information, such as a password. The consumer also attaches or associates one or more devices with the account by providing identifying information to the server software. The consumer then makes the media available to authorized remote devices for this account, at 202.

The consumer also has a remote device such as a laptop computer including remote access client software. The consumer takes the laptop computer to a different location from the home network and accesses the Internet using the laptop computer. The consumer uses the remote access client software to request remote access to the home network, at 204. The request is sent to a remote access management service, at 206.

In response to a request from the management service, the client software on the laptop computer sends authentication information to the management service identifying the consumer, the laptop computer, and the home network to access. A determination is made, at 208, whether the consumer client has been authenticated. If the consumer client has not been authenticated, an attempt is made, at 210, to authenticate the client.

If it is determined that the consumer client has been authenticated, the remote access management service determines, at 212, the rules for remote access for this account defined by the media company. The remote access management service performs, at 214, statistical analysis of remote access configurations and usages based on the defined rules. The stored remote access usage information is periodically updated with new usage information.

Based on the analysis, the remote access management service determines, at 216, whether the remote access request is appropriate. If the management service determines that the request is not appropriate, the management service denies the request for access, at 218. If the management service determines that the request is appropriate, the management service grants the request and authorizes the remote access, at 220. The remote access activity is continuously monitored and updated by the management service, at 222.

In the above examples, a consumer has accessed media from a remote location while the media company that provided the media to the consumer maintains control over the remote access through the management service 120. The consumer has achieved flexibility in use of the purchased media and so is encouraged to purchase and enjoy more media. The media company has achieved security in controlling remote access to inhibit inappropriate use of media and so is encouraged to support remote access.

The various implementations of the invention are realized in electronic hardware, computer software, or combinations of these technologies. Some implementations include one or more computer programs executed by a programmable processor or computer, such as the server software and the client software mentioned above. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description illustrates connecting the home network 110 and/or remote devices 130, 140, or 150 to the remote access management service 120 through a wide area network such as the Internet, the connection between the home network/remote devices and the management service 120 can be configured as direct connection(s). In a further example, the management service 120 can be configured as a server in the home network 110, or as part of a server or device in the home network (e.g., as software on server 112). In another example, although the above description refers to media content being stored in server(s)/device(s) in a "home" network, the term "home" refers to any local area network, whether the network is set up at home or not.

Accordingly, the present invention is not limited to only those implementations described above.

What is claimed is:
1. A home network, comprising:
   a network device configured to store media content items for remote access, and comprising a remote access server to generate account information indicating the network device and a remote device,
   wherein the remote device requests for media content items stored on the network device by issuing a remote access request,
   wherein the remote access request includes information about the remote device including the account information and a content identifier indicating the media content items;
   a remote access management service configured to receive the account information and determine whether the remote access request is appropriate by performing statistical analysis of remote access configurations and usages based on one or more authorization rules to determine an authorization status, which indicates whether the remote access request has been authorized or not,
   wherein the remote access management service requires delays between acquisition of the media content items and remote access to the media content items.

2. The home network of claim 1, wherein the remote access management service performs statistical analysis to prevent simultaneous access using a same account from different remote devices.

3. The home network of claim 1, wherein the remote access management service performs statistical analysis to prevent simultaneous access by a same account from different remote networks.

4. The home network of claim 1, wherein the remote access management service performs statistical analysis to prevent access by a same account from multiple remote networks at a relatively high frequency.

5. The home network of claim 4, wherein access from the multiple remote networks at a relatively high frequency includes multiple accesses in a short period of time from multiple remote networks.

6. The home network of claim 1, wherein the remote access management service selects the one or more authorization rules based on a content identifier that identifies the media content items to access.

7. The home network of claim 1, wherein the remote access management service selects a different set of authorization rules for each media content item.

8. The home network of claim 1, wherein the remote access management service sets the one or more authorization rules by a media company.

9. The home network of claim 1, wherein the remote access management service bases the one or more authorization rules on usage time of day pattern.

10. The home network of claim 1, wherein the remote access management service uses the one or more authorization rules to specify restrictions on remote access to certain geographical areas.

11. The home network of claim 1, wherein the remote access management service bases remote access usages on prior remote access usages.

12. A method of accessing remote media content items, comprising:
   acquiring and storing media content items on a network device for remote access by a remote device;
   generating account information indicating the network device and the remote device,
   issuing a remote access request from the remote device for media content items stored on the network device,
   wherein the remote access request includes information about the remote device including the account information and a content identifier indicating the media content items;
   receiving the account information and determining whether the remote access request is appropriate by performing statistical analysis of remote access configurations and usages based on one or more authorization rules to determine an authorization status, which indicates whether the remote access request has been authorized or not; and requiring delays between acquisition of the media content items and remote access to the media content items when the remote access request has been authorized.

13. The method of claim 12, wherein the statistical analysis is performed to prevent simultaneous access using a same account from different remote devices.

14. The method of claim 12, wherein the statistical analysis is performed to prevent simultaneous access by a same account from different remote networks.

15. The method of claim 12, wherein the statistical analysis is performed to prevent access by a same account from multiple remote networks at a relatively high frequency.

16. The method of claim 15, wherein access from the multiple remote networks at a relatively high frequency includes multiple accesses in a short period of time from multiple remote networks.

* * * * *